US011952291B2

(12) United States Patent
Guan et al.

(10) Patent No.: US 11,952,291 B2
(45) Date of Patent: Apr. 9, 2024

(54) DEVICE FOR EFFICIENTLY RECYCLING NICKEL IN WASTEWATER AND METHOD

(71) Applicant: Chongqing University of Arts and Sciences, Chongqing (CN)

(72) Inventors: Wei Guan, Chongqing (CN); Wen Zeng, Chongqing (CN); Zhongwen Ou, Chongqing (CN); Dan Song, Chongqing (CN); Subo Yang, Chongqing (CN); Yong Zhang, Chongqing (CN); Bitao Liu, Chongqing (CN); Zhigang Xie, Chongqing (CN)

(73) Assignee: Chongqing University Of Arts And Sciences, Chongqing (CN)

( * ) Notice: Subject to any disclaimer, the term of this patent is extended or adjusted under 35 U.S.C. 154(b) by 0 days.

(21) Appl. No.: 18/193,318

(22) Filed: Mar. 30, 2023

(65) Prior Publication Data

US 2023/0322583 A1    Oct. 12, 2023

(30) Foreign Application Priority Data

Apr. 11, 2022   (CN) .......................... 202210371810.2
Jul. 1, 2022    (JP) ................................. 2022-107406

(51) Int. Cl.
| | | |
|---|---|---|
| C02F 1/26 | (2023.01) | |
| C02F 1/461 | (2023.01) | |
| C02F 1/66 | (2023.01) | |
| C25C 1/08 | (2006.01) | |
| C25C 7/02 | (2006.01) | |
| C02F 101/20 | (2006.01) | |
| C02F 103/16 | (2006.01) | |

(52) U.S. Cl.
CPC ............ *C02F 1/26* (2013.01); *C02F 1/46109* (2013.01); *C02F 1/66* (2013.01); *C25C 1/08* (2013.01); *C25C 7/02* (2013.01); *C02F 2001/46133* (2013.01); *C02F 2101/20* (2013.01); *C02F 2103/16* (2013.01); *C02F 2201/005* (2013.01); *C02F 2201/46135* (2013.01); *C02F 2201/4614* (2013.01); *C02F 2201/46145* (2013.01); *C02F 2201/4615* (2013.01); *C02F 2209/06* (2013.01)

(58) Field of Classification Search
None
See application file for complete search history.

(56) References Cited

FOREIGN PATENT DOCUMENTS

| | | |
|---|---|---|
| JP | 2008507628 A | 3/2008 |
| JP | 2010229534 A | 10/2010 |

OTHER PUBLICATIONS

Notice of Examination Opinions, issued in JP2022-107406 (priority application), dated Aug. 19, 2022.
Notice of Authorization, issued in JP2022-107406 (priority application), dated Aug. 19, 2022.

*Primary Examiner* — Peter Keyworth
(74) *Attorney, Agent, or Firm* — Zhu Lehnhoff LLP

(57) ABSTRACT

Disclosed is a device for efficiently recycling nickel from wastewater and a method. The device includes a housing, and an extraction unit and an electro-deposition unit which are respectively arranged inside the housing. The device is reasonable in overall structural design. An oscillating and floating component and a rotating component in an extraction cavity are used to fully and uniformly mix a solution to maximize the extraction strength. A mixing component in an electro-deposition cavity is used to accelerate ion dispersion, to better recycle nickel. The device is easy to operate, low in cost and suitable for mass promotion.

10 Claims, 3 Drawing Sheets

DEVICE FOR EFFICIENTLY RECYCLING NICKEL IN WASTEWATER AND METHOD

REFERENCE TO RELATED APPLICATIONS

The present application claims the priorities of Chinese patent application No. 202210371810.2, filed Apr. 11, 2022, and Japanese patent application No. JP2022-107406, filed Jul. 1, 2022, the entire disclosures of the applications are incorporated herein by reference.

TECHNICAL FIELD

The present disclosure relates to the technical field of treatment of industrial wastewater, specifically to a device for efficiently recycling nickel from wastewater and a method.

BACKGROUND OF THE INVENTION

Chemical nickel plating wastewater needs to be purified before discharge. Common heavy metal wastewater treatment methods include chemical precipitation, membrane separation, ion exchange, and the like. However, these methods have many disadvantages more or less. For example, the chemical precipitation method will produce metal sludge during precipitation, which increases the difficulty and cost of treatment. The membrane separation method has a membrane pollution problem, which can easily lead to secondary pollution. Ion exchange resins have shortcomings of low strength, easy oxidation, frequent regeneration, high operation cost and the like, which greatly limits their applications in the heavy metal wastewater treatment. Therefore, it is considered to use an extraction method to perform decomplexation removal on nickel ions.

Diisooctyl phosphate has a good effect on extraction and removal of nickel, but a large amount of diisooctyl phosphate is required in actual use in nickel-containing electroplating wastewater. However, P204 is relatively expensive, resulting in extremely high economic costs. Therefore, a more suitable extraction agent is needed to reduce the economic costs.

SUMMARY OF THE INVENTION

A device for efficiently recycling nickel from wastewater includes a housing, and an extraction unit and an electro-deposition unit which are respectively arranged inside the housing;

the housing includes a housing body, and a baffle plate which is arranged inside the housing body and divides the housing body into an extraction cavity and an electro-deposition cavity from top to bottom; liquid mixing equipment connected to an external nickel-containing wastewater tank and a composite extraction agent is arranged at an upper end of the housing body; the baffle plate includes a funnel-shaped baffle plate body, and a connection pipe which is arranged at a lower end of the baffle plate body and is used for connecting the extraction cavity with the electro-deposition cavity; a first discharge outlet is formed in a top of the extraction cavity; a second discharge outlet is formed in a bottom of the electro-deposition cavity; the first discharge outlet, the second discharge outlet and the connection pipe are all provided with electromagnetic valves; the electro-deposition cavity is provided with liquid adding equipment and a liquid measurement component;

the liquid measurement component includes a sensing connection rod, a floating ball movably arranged on the sensing connection rod, a signal converter arranged at one end of the sensing connection rod and located at the bottom of the electro-deposition cavity, and a display instrument connected to the signal converter;

the extraction unit includes an oscillating and floating component arranged in the extraction cavity, a rotating component arranged at an oscillating and floating end of the oscillating and floating component, and a liquid inlet component arranged above the rotating component;

the oscillating and floating component includes an expansible and contractible module mounted in the extraction cavity, and a mounting seat arranged at an expansible and contractible end of the expansible and contractible module and used for mounting the rotating component;

the mounting seat includes a mounting seat body, a V-shaped cutting assembly with one end arranged on the mounting seat body, an oscillating and floating ring connected to the other end of the V-shaped cutting assembly, a floating ring connected to the oscillating and floating ring through a steel rope, and an oscillating and floating ball assembly hung on the floating ring through a steel rope;

the liquid inlet component includes a temporary liquid storage cavity arranged on the rotating component, and a liquid spraying component arranged on the temporary liquid storage cavity; the liquid spraying component includes a communication pipe, of which, one end is mounted on the temporary liquid storage cavity and an upper surface is provided with a liquid leaking hole, and an end pipe arranged on the other end of the communication pipe and provided with a liquid leaking hole in a side surface; the temporary liquid storage cavity is connected with the liquid mixing equipment; and the electro-deposition unit includes a cathode assembly arranged inside the electro-deposition cavity through a first mounting unit, and an anode assembly mounted inside the electro-deposition cavity through a second mounting unit and located on an outer side of the cathode assembly.

In one aspect of the present disclosure, a mixing component is arranged inside the electro-deposition cavity; the mixing component includes a plurality of sub-mixing modules respectively arranged inside the electro-deposition cavity and located on an outer side of the anode assembly; and the plurality of sub-mixing modules all include electric drive rods arranged at the bottom of the electro-deposition cavity, and sieve plates movably arranged on the electric drive rods. The electric drive rods move to drive the sieve plates arranged on the electric drive rods to more vertically, which accelerates liquid distribution and improves the dispersion capacity of plating liquid, so that nickel is distributed on a surface of a cathode more uniformly.

In one aspect of the present disclosure, the first mounting unit includes a mounting member for mounting the cathode assembly, and a sealing component arranged on the mounting member and movably mounted on the electro-deposition cavity; the sealing component includes a first sealing member and a second sealing member;

the first sealing member includes a first sealing member body, a first sealing ring arranged on an upper surface of the first sealing member body, and a first groove arranged on an outer side surface of the first sealing member body; and the second sealing member includes a second sealing member body) arranged on the first sealing member body, a second sealing ring arranged on an upper surface of the second sealing member body, and a second groove arranged on an outer side surface of the second sealing member body. The cathode assembly is mounted on the mounting member, so that the cathode assembly is convenient to take out after electro-deposition ends. An internal space of the electro-deposition cavity is sealed to maintain an electro-deposition environment and improve the electro-deposition efficiency. The first sealing member and the second sealing member are used to partially seal a side surface and an upper surface, which are in contact with connectors, of a bottom space of the electro-deposition cavity, to further optimize the electro-deposition environment.

In one aspect of the present disclosure, the mounting member includes a mounting rod for mounting the sealing component, and a mounting base arranged on the mounting rod; the mounting base includes a mounting ring mounted on the mounting rod, and a plurality of groups of connection rods circumferentially uniformly arranged on the mounting ring; the mounting rod is in threaded connection with the sealing component;

the cathode assembly includes a cathode base connected to the connection rods, and a cathode body movably arranged on the cathode base; and the cathode body is made of stainless steel. By this step, it is convenient for a user to take out the reacted cathode through the sealing member, to further recycle nickel. In addition, the stainless steel material can better deposit the nickel on the surface, to further improve the electro-deposition efficiency.

In one aspect of the present disclosure, the second mounting unit includes a mounting body arranged inside the electro-deposition cavity through a drive rod and provided with a liquid guide through hole, and a mounting slot formed in an outer side surface of the mounting body; the anode assembly is mounted on the mounting body through the mounting slot; and the anode assembly adopts a ruthenium-titanium mesh. The liquid guide through hole achieves unrestricted circulation of the plating liquid. It is convenient for the user to use a clamping structure of the anode assembly to replace the anode assembly, thus optimizing the electro-deposition environment. The ruthenium-titanium mesh structure can enable the plating liquid to circulate, can also increase a density of electroplating current, has good conductivity and corrosion resistance, and provides favorable conditions for an electroplating environment.

In one aspect of the present disclosure, a nickel recycling method using the above device includes:

S1: wastewater pretreatment adjusting a pH of nickel-containing wastewater to 3-9;

S2: extraction introducing the pretreated nickel-containing wastewater and a composite extraction agent into the extraction cavity through the liquid mixing equipment according to a volume ratio of 9-12:1, and turning on the oscillating and floating component and the rotating component to assist in extraction for 10-20 min; opening the electromagnetic valve on the connection pipe, stopping feeding liquid after the extraction cavity and the electro-deposition cavity are filled with the nickel-containing wastewater, and turning off the rotating component; and performing extraction for 10-20 min under the assistance of the oscillating and floating component;

S3: desorption opening the electromagnetic valve on the first discharge outlet, reading a liquid level of heavy phase liquid on the display instrument, adding, to the electro-deposition cavity through the liquid adding equipment, sulfuric acid that has the same volume as that of an electro-deposition solution and a concentration of 1 mol/L, driving the sieve plates to move in a vertical direction through the electric drive rods, and obtaining enriched liquid after reaction for 15-25 min, where when the sulfuric acid is added, a light phase substance having the same volume as that of the sulfuric acid is discharged from the first discharge outlet, and the light phase substance is specifically wastewater without nickel ions; and S4: electro-deposition rotating the mounting rod to enable the cathode assembly to move in the vertical direction, driving, by using the drive rod, the second mounting unit and the anode assembly arranged on the second mounting unit to move in the vertical direction to ensure that the cathode assembly and the anode assembly sink into the enriched liquid simultaneously, and performing electro-deposition treatment for 10-20 min on the enriched liquid under conditions of a current of 2-3 A and a voltage of 32-35 V by using the electro-deposition unit in the electro-deposition cavity; and discharging the liquid inside the housing body from the second discharge outlet.

Compared with the prior art, the present disclosure is reasonable in overall structural design. The oscillating and floating component and the rotating component in the extraction cavity are used to fully and uniformly mix the solution, to maximize the extraction strength, and the mixing component in the electro-deposition cavity is used to accelerate dispersion of ions, to better recycle nickel. In addition, diisooctyl phosphate and 2-bromodecanoic acid are mixed to form a composite extraction agent to perform extraction treatment on the nickel-containing wastewater. The sulfuric acid is used to desorb the supernate-removed solution. Finally, the ruthenium-titanium mesh anode and the stainless steel cathode are used to perform electro-deposition treatment on the enriched liquid under specific conditions. The cathode is taken out, cleaned, dried with air, and weighed, to achieve nickel recycling. The present disclosure is easy to operate, low i cost and suitable for mass promotion.

Figure 1:
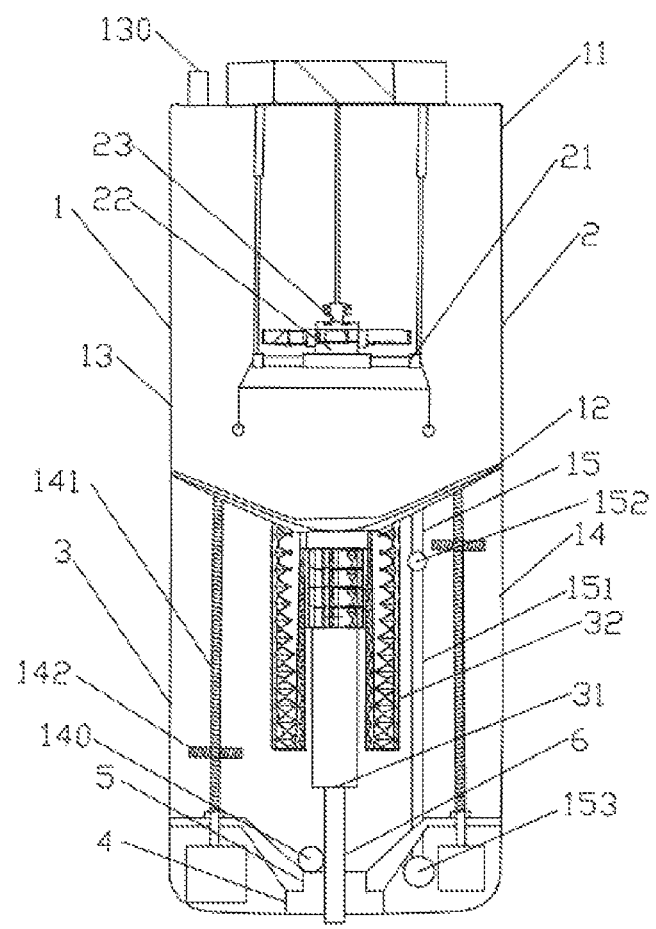
FIG. 1 is a sectional diagram of an embodiment of the present disclosure.

In the drawings: 1: housing; 11: housing body; 12: baffle plate; 13: extraction cavity; 130: first discharge outlet; 14: electro-deposition cavity; 140: second discharge outlet; 141: electric drive rod; 142: sieve plate; 15: liquid measurement component; 151: sensing connection rod; 152: floating ball; 153: signal converter; 2: extraction unit; 21: oscillating and floating component; 211: expansible and contractible module; 212: mounting seat; 2121: mounting seat body; 2122:

V-shaped cutting assembly; 2123: oscillating and floating ring; 2124: floating ring; 2125: oscillating and floating ball assembly; 22: rotating component; 23: liquid inlet component; 231: temporary liquid storage cavity; 232: liquid spraying component; 2321: communication pipe; 2322: end pipe; 3: electro-deposition unit; 31: cathode assembly; 311: cathode base; 312: cathode body; 32: anode assembly; 320: liquid guide through hole; 321: mounting body; 322: mounting slot; 4: first sealing member; 41: first sealing member body; 42: first sealing ring; 43: first groove; 5: second sealing member; 51: second sealing member body; 52: second sealing ring; 53: second groove; 6: mounting member; 61: mounting rod; 62: mounting base; 621: mounting ring; and 622: connection rod.

DETAILED DESCRIPTION OF THE INVENTION

Embodiment 1

A device for efficiently recycling nickel from wastewater as shown in FIG. 1 includes a housing 1, and an extraction unit 2 and an electro-deposition unit 3 which are respectively arranged inside the housing 1.

The housing 1 includes a housing body 11, and a baffle plate 12 which is arranged inside the housing body 11 and divides the housing body 11 into an extraction cavity 13 and an electro-deposition cavity 14 from top to bottom. Liquid mixing equipment connected to an external nickel-containing wastewater tank and a composite extraction agent is arranged at an upper end of the housing body 11. The baffle plate 12 includes a funnel-shaped baffle plate body, and a connection pipe which is arranged at a lower end of the baffle plate body and is used for connecting the extraction cavity 13 with the electro-deposition cavity 14. A first discharge outlet 130 is formed in a top of the extraction cavity 13. A second discharge outlet 140 is formed in a bottom of the electro-deposition cavity 14. The first discharge outlet 130, the second discharge outlet 140 and the connection pipe are all provided with electromagnetic valves. The electro-deposition cavity 14 is provided with liquid adding equipment and a liquid measurement component 15. The liquid measurement component 15 includes a sensing connection rod 151, a floating ball 152 movably arranged on the sensing connection rod 151, a signal converter 153 arranged at one end of the sensing connection rod 151 and located at the bottom of the electro-deposition cavity 14, and a display instrument connected to the signal converter 153. A density of the floating ball is greater than that of the nickel-containing wastewater and less than that of the composite extraction agent.

The extraction unit 2 includes an oscillating and floating component 21 arranged in the extraction cavity 13, a rotating component 22 arranged at an oscillating and floating end of the oscillating and floating component 21, and a liquid inlet component 23 arranged above the rotating component 22.

Figure 2:
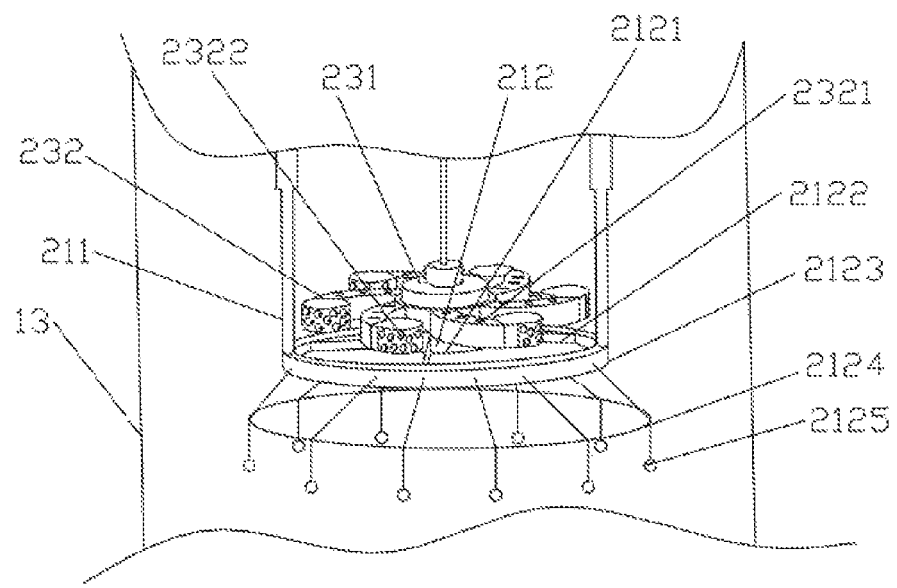
FIG. 2 is a schematic structural diagram of an extraction unit of an embodiment of the present disclosure.

As shown in FIG. 2, the oscillating and floating component 21 includes an expansible and contractible module 211 mounted in the extraction cavity 13, and a mounting seat 212 arranged at an expansible and contractible end of the expansible and contractible module 211 and used for mounting the rotating component 22.

The mounting seat 212 includes a mounting seat body 2121, a V-shaped cutting assembly 2122 with one end arranged on the mounting seat body 2121, an oscillating and floating ring 2123 connected to the other end of the V-shaped cutting assembly 2122, a floating ring 2124 connected to the oscillating and floating ring 2123 through a steel rope, and an oscillating and floating ball assembly 2125 hung on the floating ring 2124 through a steel rope.

The rotating component 22 adopts an electric turntable.

The liquid inlet component 23 includes a temporary liquid storage cavity 231 arranged on the rotating component 22, and a liquid spraying component 232 arranged on the temporary liquid storage cavity 231. The liquid spraying component 232 includes a communication pipe 2321, of which, one end is mounted on the temporary liquid storage cavity 231 and an upper surface is provided with a liquid leaking hole, and an end pipe 2322 arranged on the other end of the communication pipe 2321 and provided with a liquid leaking hole in a side surface; a hose is arranged at a port of the temporary liquid storage cavity 231; and the other end of the hose is connected with the liquid mixing equipment.

As shown in FIG. 1, the electro-deposition unit 3 includes a cathode assembly 31 arranged inside the electro-deposition cavity 14 through a first mounting unit, and an anode assembly 32 mounted inside the electro-deposition cavity 14 through a second mounting unit and located on an outer side of the cathode assembly 31.

As shown in FIG. 1 and FIG. 2, a mixing component is arranged inside the electro-deposition cavity 14. The mixing component includes a plurality of sub-mixing modules respectively arranged inside the electro-deposition cavity 14 and located on an outer side of the anode assembly 32. The plurality of sub-mixing modules all include electric drive rods 141 arranged at the bottom of the electro-deposition cavity 14, and sieve plates 142 movably arranged on the electric drive rods 141.

Figure 3:
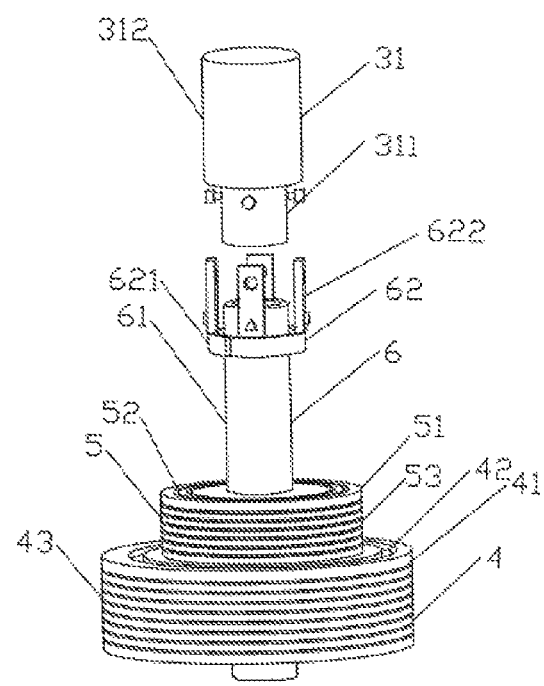
FIG. 3 is a schematic structural diagram of a first mounting unit of an embodiment of the present disclosure.

As shown in FIG. 3, the first mounting unit includes a mounting member 6 for mounting the cathode assembly 31, and a sealing component arranged on the mounting member 6 and movably mounted on the electro-deposition cavity 14. The sealing component includes a first sealing member 4 and a second sealing member 5.

The first sealing member 4 includes a first sealing member body 41, a first sealing ring 42 arranged on an upper surface of the first sealing member body 41, and a first groove 43 arranged on an outer side surface of the first sealing member body 41.

The second sealing member 5 includes a second sealing member body 51 arranged on the first sealing member body 41, a second sealing ring 52 arranged on an upper surface of the second sealing member body 51, and a second groove 53 arranged on an outer side surface of the second sealing member body 51.

The mounting member 6 includes a mounting rod 61 for mounting the sealing component, and a mounting base 62 arranged on the mounting rod 61. The mounting base 62 includes a mounting ring 621 mounted on the mounting rod 61, and a plurality of groups of connection rods 622 circumferentially uniformly arranged on the mounting ring 621. The mounting rod 61 is in threaded connection with the sealing component.

The cathode assembly 31 includes a cathode base 311 connected to the connection rods 622, and a cathode body 312 movably arranged on the cathode base 311. The cathode body 312 is made of a stainless steel material.

Figure 4:
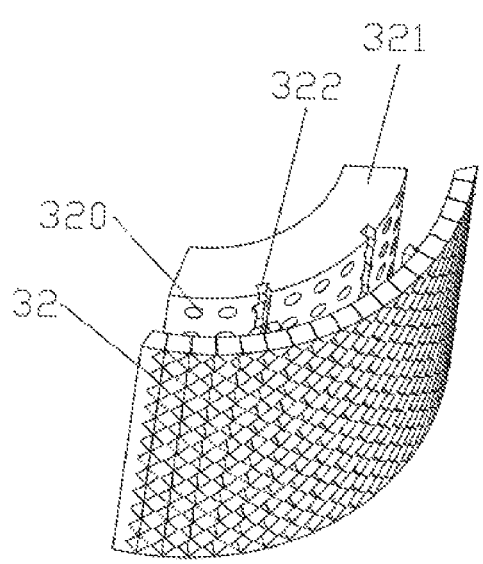
FIG. 4 is a schematic structural diagram of a second mounting unit of an embodiment of the present disclosure.

As shown in FIG. 4, the second mounting unit includes a mounting body 321 arranged inside the electro-deposition cavity 14 through a drive rod and provided with a liquid guide through hole 320, and a mounting slot 322 formed in an outer side surface of the mounting body 321. The anode assembly 32 is mounted on the mounting body 321 through the mounting slot 322. The anode assembly 32 adopts a ruthenium-titanium mesh.

Embodiment 2

This embodiment discloses a method for efficiently recycling nickel from wastewater by using the device of Embodiment 1. The method includes:

S1: Wastewater Pretreatment

A pH of nickel-containing wastewater to be treated was adjusted to 3.

S2: Extraction

The pretreated nickel-containing wastewater and a composite extraction agent were introduced into the extraction cavity 13 through the liquid mixing equipment according to a volume ratio of 9:1, and the oscillating and floating component 21 and the rotating component 22 were turned on to assist in extraction for 10 min. The electromagnetic valve on the connection pipe was opened. Feeding of liquid was stopped after the extraction cavity 13 and the electro-deposition cavity 14 were filled with the nickel-containing wastewater, and the rotating component 22 was turned off; and extraction was performed for 10 min under the assistance of the oscillating and floating component 21.

S3: Desorption

The electromagnetic valve on the first discharge outlet 130 was opened; a liquid level of heavy phase liquid was read on the display instrument. Sulfuric acid that had the same volume as that of an electro-deposition solution and a concentration of 1 mol/L was added to the electro-deposition cavity 14 through the liquid adding equipment. The sieve plates 142 are driven to move in a vertical direction through the electric drive rods 141, and enriched liquid was obtained after reaction for 15 min, where when the sulfuric acid was added, a light phase substance having the same volume as that of the sulfuric acid was discharged from the first discharge outlet 130, and the light phase substance was specifically wastewater without nickel ions.

S4: Electro-Deposition

The mounting rod 61 was rotated to enable the cathode assembly 31 to move in the vertical direction. The second mounting unit and the anode assembly 32 arranged on the second mounting unit were driven, by using the drive rod, to move in the vertical direction to ensure that the cathode assembly 31 and the anode assembly 32 sink into the enriched liquid simultaneously. Electro-deposition treatment was performed for 10 min on the enriched liquid under conditions of a current of 2 A and a voltage of 32 V by using the electro-deposition unit 3 in the electro-deposition cavity 14. The liquid inside the housing body 11 was discharged from the second discharge outlet 140.

It should be noted that a motor, the electric turntable, the electromagnetic valves, the cathode assembly 31 and the anode assembly 32 in this embodiment are all commercially available. The V-shaped cutting assembly 2122 in this embodiment adopts a commercially available metal cutting blade with a thickness of 3.2 mm. The oscillating and floating ball assembly 2125 adopts a commercially available hollow ball.

Embodiment 3

What is different from Embodiment 2 is that: A method for efficiently recycling nickel from wastewater includes:

S1: Wastewater Pretreatment

A pH of nickel-containing wastewater to be treated was adjusted to 7.

S2: Extraction

The pretreated nickel-containing wastewater and a composite extraction agent were introduced into the extraction cavity 13 through the liquid mixing equipment according to a volume ratio of 10:1, and the oscillating and floating component 21 and the rotating component 22 were turned on to assist in extraction for 15 min. The electromagnetic valve on the connection pipe was opened. Feeding of liquid was stopped after the extraction cavity 13 and the electro-deposition cavity 14 were filled with the nickel-containing wastewater, and the rotating component 22 was turned off; and extraction was performed for 15 min under the assistance of the oscillating and floating component 21.

S3: Desorption

The electromagnetic valve on the first discharge outlet 130 was opened; a liquid level of heavy phase liquid was read on the display instrument. Sulfuric acid that had the same volume as that of an electro-deposition solution and a concentration of 1 mol/L was added to the electro-deposition cavity 14 through the liquid adding equipment. The sieve plates 142 are driven to move in a vertical direction through the electric drive rods 141, and enriched liquid was obtained after reaction for 20 min, where when the sulfuric acid was added, a light phase substance having the same volume as that of the sulfuric acid was discharged from the first discharge outlet 130, and the light phase substance was specifically wastewater without nickel ions.

S4: Electro-Deposition

The mounting rod 61 was rotated to enable the cathode assembly 31 to move in the vertical direction. The second mounting unit and the anode assembly 32 arranged on the second mounting unit were driven, by using the drive rod, to move in the vertical direction to ensure that the cathode assembly 31 and the anode assembly 32 sink into the enriched liquid simultaneously. Electro-deposition treatment was performed for 15 min on the enriched liquid under conditions of a current of 2.5 A and a voltage of 33 V by using the electro-deposition unit 3 in the electro-deposition cavity 14. The liquid inside the housing body 11 was discharged from the second discharge outlet 140.

Embodiment 4

What is different from Embodiment 2 is that: A method for efficiently recycling nickel from wastewater includes:

S1: Wastewater Pretreatment

A pH of nickel-containing wastewater to be treated was adjusted to 9.

S2: Extraction

The pretreated nickel-containing wastewater and a composite extraction agent were introduced into the extraction cavity 13 through the liquid mixing equipment according to a volume ratio of 12:1, and the oscillating and floating component 21 and the rotating component 22 were turned on to assist in extraction for 20 min. The electromagnetic valve on the connection pipe was opened. Feeding of liquid was stopped after the extraction cavity 13 and the electro-deposition cavity 14 were filled with the nickel-containing wastewater, and the rotating component 22 was turned off; and extraction was performed for 20 min under the assistance of the oscillating and floating component 21.

S3: Desorption

The electromagnetic valve on the first discharge outlet 130 was opened; a liquid level of heavy phase liquid was read on the display instrument. Sulfuric acid that had the same volume as that of an electro-deposition solution and a concentration of 1 mol/L was added to the electro-deposition cavity 14 through the liquid adding equipment. The sieve plates 142 are driven to move in a vertical direction through the electric drive rods 141, and enriched liquid was obtained after reaction for 25 min, where when the sulfuric acid was added, a light phase substance having the same volume as that of the sulfuric acid was discharged from the first discharge outlet 130, and the light phase substance was specifically wastewater without nickel ions.

S4: Electro-Deposition

The mounting rod 61 was rotated to enable the cathode assembly 31 to move in the vertical direction. The second mounting unit and the anode assembly 32 arranged on the second mounting unit were driven, by using the drive rod, to move in the vertical direction to ensure that the cathode assembly 31 and the anode assembly 32 sink into the enriched liquid simultaneously. Electro-deposition treatment was performed for 20 min on the enriched liquid under conditions of a current of 3 A and a voltage of 35V by using the electro-deposition unit 3 in the electro-deposition cavity 14. The liquid inside the housing body 11 was discharged from the second discharge outlet 140.

EXPERIMENTAL EXAMPLES

The device of Embodiment 1 was used to treat nickel-containing wastewater. A pH value of the nickel-containing wastewater was 5.7, and a concentration was 6.5 g/L.

Experiment group 1: The nickel-containing wastewater was directly mixed with a composite extraction agent according to a volume ratio of 9:1, where a volume of 2-bromodecanoic acid was 6.5% of a total volume of a composite catalyst. The nickel-containing wastewater and the composite extraction agent were stirred at a normal temperature for reaction for 10 min. After extraction stratification, supernate was removed. The solution was mixed with isometric sulfuric acid with a concentration of 1 mol/L for reaction for 20 min. Electro-deposition was performed on enriched liquid at a current of 2 A and a voltage of 33 V for 15 min.

Experiment group 2: The pH of the nickel-containing wastewater was adjusted to 3. The nickel-containing wastewater was then mixed with a composite extraction agent according to a volume ratio of 9:1, where a volume of 2-bromodecanoic acid was 6.5% of a total volume of a composite catalyst. The nickel-containing wastewater and the composite extraction agent were stirred at a normal temperature for reaction for 10 min. After extraction stratification, supernate was removed. The solution was mixed with isometric sulfuric acid with a concentration of 1 mol/L for reaction for 20 min. Electro-deposition was performed on enriched liquid at a current of 2 A and a voltage of 33 V for 15 min.

Experiment group 3: The pH of the nickel-containing wastewater was adjusted to 9. The nickel-containing wastewater was then mixed with a composite extraction agent according to a volume ratio of 9:1, where a volume of 2-bromodecanoic acid was 6.5% of a total volume of a composite catalyst. The nickel-containing wastewater and the composite extraction agent were stirred at a normal temperature for reaction for 10 min. After extraction stratification, supernate was removed. The solution was mixed with isometric sulfuric acid with a concentration of 1 mol/L for reaction for 20 min. Electro-deposition was performed on enriched liquid at a current of 2 A and a voltage of 33 V for 15 min.

Experiment group 4: The pH of the nickel-containing wastewater was adjusted to 9. The nickel-containing wastewater was then mixed with a composite extraction agent according to a volume ratio of 10:1, where a volume of 2-bromodecanoic acid was 6.5% of a total volume of a composite catalyst. The nickel-containing wastewater and the composite extraction agent were stirred at a normal temperature for reaction for 10 min. After extraction stratification, supernate was removed. The solution was mixed with isometric sulfuric acid with a concentration of 1 mol/L for reaction for 20 min. Electro-deposition was performed on enriched liquid at a current of 2 A and a voltage of 33 V for 15 min.

Experiment group 5: The pH of the nickel-containing wastewater was adjusted to 8. The nickel-containing wastewater was then mixed with a composite extraction agent according to a volume ratio of 10:1, where a volume of 2-bromodecanoic acid was 6.5% of a total volume of a composite catalyst. The nickel-containing wastewater and the composite extraction agent were stirred at a normal temperature for reaction for 10 min. After extraction stratification, supernate was removed. The solution was mixed with isometric sulfuric acid with a concentration of 1 mol/L for reaction for 20 min. Electro-deposition was performed on enriched liquid at a current of 2 A and a voltage of 33 V for 15 min.

Experiment group 6: The pH of the nickel-containing wastewater was adjusted to 8. The nickel-containing wastewater was then mixed with a composite extraction agent according to a volume ratio of 12:1, where a volume of 2-bromodecanoic acid was 6.5% of a total volume of a composite catalyst. The nickel-containing wastewater and the composite extraction agent were stirred at a normal temperature for reaction for 10 min. After extraction stratification, supernate was removed. The solution was mixed with isometric sulfuric acid with a concentration of 1 mol/L for reaction for 20 min. Electro-deposition was performed on enriched liquid at a current of 2 A and a voltage of 33 V for 15 min.

Experiment group 7: The pH of the nickel-containing wastewater was adjusted to 8. The nickel-containing wastewater was then mixed with a composite extraction agent according to a volume ratio of 10:1, where a volume of 2-bromodecanoic acid was 10% of a total volume of a composite catalyst. The nickel-containing wastewater and the composite extraction agent were stirred at a normal temperature for reaction for 10 min. After extraction stratification, supernate was removed. The solution was mixed with isometric sulfuric acid with a concentration of 1 mol/L for reaction for 20 min. Electro-deposition was performed on enriched liquid at a current of 2 A and a voltage of 33 V for 15 min.

Experiment group 8: The pH of the nickel-containing wastewater was adjusted to 8. The nickel-containing wastewater was then mixed with a composite extraction agent according to a volume ratio of 10:1, where a volume of 2-bromodecanoic acid was 12% of a total volume of a composite catalyst. The nickel-containing wastewater and the composite extraction agent were stirred at a normal temperature for reaction for 10 min. After extraction stratification, supernate was removed. The solution was mixed with isometric sulfuric acid with a concentration of 1 mol/L for reaction for 20 min. Electro-deposition was performed on enriched liquid at a current of 2 A and a voltage of 33 V for 15 min.

The wastewater treated in experiment groups 1 to 8 was tested and calculated separately. The cathode 31 was weighed for calculation after being taken out, to obtain a removal rate and a recycling rate of nickel ions as shown in Table 1.

TABLE 1

Removal rates and recycling rates of nickel ions in experiment groups 1 to

| | Group | | | | | | | |
|---|---|---|---|---|---|---|---|---|
| | Experiment group 1 | Experiment group 2 | Experiment group 3 | Experiment group 4 | Experiment group 5 | Experiment group 6 | Experiment group 7 | Experiment group 8 |
| Removal rate/% | 87.9 | 84.6 | 88.1 | 88.23 | 88.36 | 85.29 | 91.72 | 86.5 |
| Recycling rate/% | 98.3 | 97.5 | 98.9 | 99.0 | 99.1 | 97.9 | 99.6 | 98.1 |

Conclusions: According to changes of the removal rates and the recycling rates of nickel ions in experiment group 1, experiment group 2 and experiment group 3 in the table, it can be concluded that the volume ratio of the 2-bromodecanoic acid to the composite catalyst is not limited. Within the pH range of 3 to 9, the composite catalyst has a high removal rate of nickel ions. If the pH is reduced to 5.7 or below, the removal rate of nickel ions is in an obvious declining trend.

According to changes of the removal rates and the recycling rates of nickel ions in experiment group 3, experiment group 4, experiment group 5 and experiment group 6, it can be concluded that as the dosage of the composite extraction agent decreases, the removal rate of nickel ions is maintained at a high level. Optimally, when the volume ratio of the nickel-containing wastewater to the composite extraction agent is 10:1, the removal rate of nickel ions is 88.36%. If the dosage of the composite extraction agent then continuously decreases, the removal rate of nickel ions is in a dramatic declining trend.

According to changes in the removal rates and the recycling rates of nickel ions in experiment group 5, experiment group 7 and experiment group 8, it can be concluded that as the volume ratio of the 2-bromodecanoic acid to the composite catalyst increases, the removal rate of nickel ions is in a rising trend. When the volume of the 2-bromodecanoic acid is about 10% of the total volume of the composite catalyst, the maximum removal rate of nickel ions is 91.72%, and the recycling rate of nickel ions is 99.6%. The 2-bromodecanoic acid is then continuously added, and the removal rate of nickel ions starts to decrease. When the volume of the 2-bromodecanoic acid is about 12% of the total volume of the composite catalyst, the removal rate of nickel ions decreases to 86.5%.

To sum up, when the pH of the nickel-containing wastewater is 8, the volume ratio of the nickel-containing wastewater to the composite extraction agent is 10:1, and the volume of the 2-bromodecanoic acid is 10% of the total volume of the composite catalyst, the maximum recycling rate of nickel ions is 99.6%.

What is claimed is:
1. A device for efficiently recycling nickel from wastewater, comprising a housing (1), and an extraction unit (2) and an electro-deposition unit (3) which are respectively arranged inside the housing (1), wherein
the housing (1) comprises a housing body (11), and a baffle plate (12) which is arranged inside the housing body (11) and divides the housing body (11) into an extraction cavity (13) and an electro-deposition cavity (14) from top to bottom; liquid mixing equipment connected to an external nickel-containing wastewater tank and a composite extraction agent is arranged at an upper end of the housing body (11); the baffle plate (12) comprises a funnel-shaped baffle plate body, and a connection pipe which is arranged at a lower end of the baffle plate body and is used for connecting the extraction cavity (13) with the electro-deposition cavity (14); a first discharge outlet (130) is formed in a top of the extraction cavity (13); a second discharge outlet (140) is formed in a bottom of the electro-deposition cavity (14); the first discharge outlet (130), the second discharge outlet (140) and the connection pipe are all provided with electromagnetic valves; the electro-deposition cavity (14) is provided with liquid adding equipment and a liquid measurement component (15);
the liquid measurement component (15) comprises a sensing connection rod (151), a floating ball (152) movably arranged on the sensing connection rod (151), a signal converter (153) arranged at one end of the sensing connection rod (151) and located at the bottom of the electro-deposition cavity (14), and a display instrument connected to the signal converter (153);
the extraction unit (2) comprises an oscillating and floating component (21) arranged in the extraction cavity (13), a rotating component (22) arranged at an oscillating and floating end of the oscillating and floating component (21), and a liquid inlet component (23) arranged above the rotating component (22);
the oscillating and floating component (21) comprises an expansible and contractible module (211) mounted in the extraction cavity (13), and a mounting seat (212) arranged at an expansible and contractible end of the expansible and contractible module (211) and used for mounting the rotating component (22);
the mounting seat (212) comprises a mounting seat body (2121), a V-shaped cutting assembly (2122) with one end arranged on the mounting seat body (2121), an oscillating and floating ring (2123) connected to the other end of the V-shaped cutting assembly (2122), a floating ring (2124) connected to the oscillating and floating ring (2123) through a steel rope, and an oscillating and floating ball assembly (2125) hung on the floating ring (2124) through a steel rope;
the liquid inlet component (23) comprises a temporary liquid storage cavity (231) arranged on the rotating component (22), and a liquid spraying component (232) arranged on the temporary liquid storage cavity (231); the liquid spraying component (232) comprises a communication pipe (2321), of which, one end is mounted on the temporary liquid storage cavity (231) and an upper surface is provided with a liquid leaking hole, and an end pipe (2322) arranged at the other end of the communication pipe (2321) and provided with a liquid leaking hole in a side surface; the temporary liquid storage cavity (231) is connected with the liquid mixing equipment; and the electro-deposition unit (3) comprises a cathode assembly (31) arranged inside the electro-deposition cavity (14) through a first mounting unit, and an anode assembly (32) mounted inside the electro-deposition cavity (14) through a second mounting unit and located on an outer side of the cathode assembly (31).

2. The device for efficiently recycling the nickel from the wastewater according to claim 1, wherein a mixing component is arranged inside the electro-deposition cavity (14); the mixing component comprises a plurality of sub-mixing modules respectively arranged inside the electro-deposition cavity (14) and located on an outer side of the anode assembly (32); and the plurality of sub-mixing modules all comprise electric drive rods (141) arranged at the bottom of the electro-deposition cavity (14), and sieve plates (142) movably arranged on the electric drive rods (141).

3. The device for efficiently recycling the nickel from the wastewater according to claim 1, wherein the first mounting unit comprises a mounting member (6) for mounting the cathode assembly (31), and a sealing component arranged on the mounting member (6) and movably mounted on the electro-deposition cavity (14); the sealing component comprises a first sealing member (4) and a second sealing member (5);

the first sealing member (4) comprises a first sealing member body (41), a first sealing ring (42) arranged on an upper surface of the first sealing member body (41), and a first groove (43) arranged on an outer side surface of the first sealing member body (41); and the second sealing member (5) comprises a second sealing member body (51) arranged on the first sealing member body (41), a second sealing ring (52) arranged on an upper surface of the second sealing member body (51), and a second groove (53) arranged on an outer side surface of the second sealing member body (51).

4. The device for efficiently recycling the nickel from the wastewater according to claim 3, wherein the mounting member (6) comprises a mounting rod (61) for mounting the sealing component, and a mounting base (62) arranged on the mounting rod (61); the mounting base (62) comprises a mounting ring (621) mounted on the mounting rod (61), and a plurality of groups of connection rods (622) circumferentially uniformly arranged on the mounting ring (621); the mounting rod (61) is in threaded connection with the sealing component;

the cathode assembly (31) comprises a cathode base (311) connected to the connection rods (622), and a cathode body (312) movably arranged on the cathode base (311); and the cathode body (312) is made of stainless steel.

5. The device for efficiently recycling the nickel from the wastewater according to claim 1, wherein the second mounting unit comprises a mounting body (321) arranged inside the electro-deposition cavity (14) through a drive rod and provided with a liquid guide through hole (320), and a mounting slot (322) formed in an outer side surface of the mounting body (321); the anode assembly (32) is mounted on the mounting body (321) through the mounting slot (322); and the anode assembly (32) adopts a ruthenium-titanium mesh.

6. A nickel recycling method of the device according to claim 5, comprising:

S1: wastewater pretreatment
adjusting a pH of nickel-containing wastewater to 3-9;

S2: extraction
introducing the pretreated nickel-containing wastewater and a composite extraction agent into the extraction cavity (13) through the liquid mixing equipment according to a volume ratio of 9-12:1, and turning on the oscillating and floating component (21) and the rotating component (22) to assist in extraction for 10-20 min; opening the electromagnetic valve on the connection pipe, stopping feeding liquid after the extraction cavity (13) and the electro-deposition cavity (14) are filled with the nickel-containing wastewater, and turning off the rotating component (22); and performing extraction for 10-20 min under the assistance of the oscillating and floating component (21);

S3: desorption
opening the electromagnetic valve on the first discharge outlet (130), reading a liquid level of heavy phase liquid on the display instrument, adding, to the electro-deposition cavity (14) through the liquid adding equipment, sulfuric acid that has the same volume as that of an electro-deposition solution and a concentration of 1 mol/L, driving sieve plates (142) to move in a vertical direction through electric drive rods (141), and obtaining enriched liquid after reaction for 15-25 min, where when the sulfuric acid is added, a light phase substance having the same volume as that of the sulfuric acid is discharged from the first discharge outlet (130), and the light phase substance is specifically wastewater without nickel ions; and S4: electro-deposition
rotating the mounting rod (61) to enable the cathode assembly (31) to move in the vertical direction, driving, by using the drive rod, the second mounting unit and the anode assembly (32) arranged on the second mounting unit to move in the vertical direction to ensure that the cathode assembly (31) and the anode assembly (32) sink into the enriched liquid simultaneously, and performing electro-deposition treatment for 10-20 min on the enriched liquid under conditions of a current of 2-3 A and a voltage of 32-35 V by using the electro-deposition unit (3) in the electro-deposition cavity (14); and discharging the liquid inside the housing body (11) from the second discharge outlet (140).

7. A nickel recycling method of the device according to claim 4, comprising:

S1: wastewater pretreatment
adjusting a pH of nickel-containing wastewater to 3-9;

S2: extraction
introducing the pretreated nickel-containing wastewater and a composite extraction agent into the extraction cavity (13) through the liquid mixing equipment according to a volume ratio of 9-12:1, and turning on the oscillating and floating component (21) and the rotating component (22) to assist in extraction for 10-20 min; opening the electromagnetic valve on the connection pipe, stopping feeding liquid after the extraction cavity (13) and the electro-deposition cavity (14) are filled with the nickel-containing wastewater, and turning off the rotating component (22); and performing extraction for 10-20 min under the assistance of the oscillating and floating component (21);

S3: desorption
opening the electromagnetic valve on the first discharge outlet (130), reading a liquid level of heavy phase liquid on the display instrument, adding, to the electro-deposition cavity (14) through the liquid adding equipment, sulfuric acid that has the same volume as that of an electro-deposition solution and a concentration of 1 mol/L, driving sieve plates (142) to move in a vertical direction through electric drive rods (141), and obtaining enriched liquid after reaction for 15-25 min, where when the sulfuric acid is added, a light phase substance having the same volume as that of the sulfuric acid is discharged from the first discharge outlet (130), and the light phase substance is specifically wastewater without nickel ions; and S4: electro-deposition rotating the mounting rod (61) to enable the cathode assembly (31) to move in the vertical direction, driving, by using the drive rod, the second mounting unit and the anode assembly (32) arranged on the second mounting unit to move in the vertical direction to ensure that the cathode assembly (31) and the anode assembly (32) sink into the enriched liquid simultaneously, and performing electro-deposition treatment for 10-20 min on the enriched liquid under conditions of a current of 2-3 A and a voltage of 32-35 V by using the electro-deposition unit (3) in the electro-deposition cavity (14); and discharging the liquid inside the housing body (11) from the second discharge outlet (140).

8. A nickel recycling method of the device according to claim 3, comprising:

S1: wastewater pretreatment adjusting a pH of nickel-containing wastewater to 3-9;

S2: extraction introducing the pretreated nickel-containing wastewater and a composite extraction agent into the extraction cavity (13) through the liquid mixing equipment according to a volume ratio of 9-12:1, and turning on the oscillating and floating component (21) and the rotating component (22) to assist in extraction for 10-20 min; opening the electromagnetic valve on the connection pipe, stopping feeding liquid after the extraction cavity (13) and the electro-deposition cavity (14) are filled with the nickel-containing wastewater, and turning off the rotating component (22); and performing extraction for 10-20 min under the assistance of the oscillating and floating component (21);

S3: desorption opening the electromagnetic valve on the first discharge outlet (130), reading a liquid level of heavy phase liquid on the display instrument, adding, to the electro-deposition cavity (14) through the liquid adding equipment, sulfuric acid that has the same volume as that of an electro-deposition solution and a concentration of 1 mol/L, driving sieve plates (142) to move in a vertical direction through electric drive rods (141), and obtaining enriched liquid after reaction for 15-25 min, where when the sulfuric acid is added, a light phase substance having the same volume as that of the sulfuric acid is discharged from the first discharge outlet (130), and the light phase substance is specifically wastewater without nickel ions; and S4: electro-deposition rotating a mounting rod (61) to enable the cathode assembly (31) to move in the vertical direction, driving, by using the drive rod, the second mounting unit and the anode assembly (32) arranged on the second mounting unit to move in the vertical direction to ensure that the cathode assembly (31) and the anode assembly (32) sink into the enriched liquid simultaneously, and performing electro-deposition treatment for 10-20 min on the enriched liquid under conditions of a current of 2-3 A and a voltage of 32-35 V by using the electro-deposition unit (3) in the electro-deposition cavity (14); and discharging the liquid inside the housing body (11) from the second discharge outlet (140).

9. A nickel recycling method of the device according to claim 2, comprising:

S1: wastewater pretreatment adjusting a pH of nickel-containing wastewater to 3-9;

S2: extraction introducing the pretreated nickel-containing wastewater and a composite extraction agent into the extraction cavity (13) through the liquid mixing equipment according to a volume ratio of 9-12:1, and turning on the oscillating and floating component (21) and the rotating component (22) to assist in extraction for 10-20 min; opening the electromagnetic valve on the connection pipe, stopping feeding liquid after the extraction cavity (13) and the electro-deposition cavity (14) are filled with the nickel-containing wastewater, and turning off the rotating component (22); and performing extraction for 10-20 min under the assistance of the oscillating and floating component (21);

S3: desorption opening the electromagnetic valve on the first discharge outlet (130), reading a liquid level of heavy phase liquid on the display instrument, adding, to the electro-deposition cavity (14) through the liquid adding equipment, sulfuric acid that has the same volume as that of an electro-deposition solution and a concentration of 1 mol/L, driving the sieve plates (142) to move in a vertical direction through the electric drive rods (141), and obtaining enriched liquid after reaction for 15-25 min, where when the sulfuric acid is added, a light phase substance having the same volume as that of the sulfuric acid is discharged from the first discharge outlet (130), and the light phase substance is specifically wastewater without nickel ions; and S4: electro-deposition rotating a mounting rod (61) to enable the cathode assembly (31) to move in the vertical direction, driving, by using the drive rod, the second mounting unit and the anode assembly (32) arranged on the second mounting unit to move in the vertical direction to ensure that the cathode assembly (31) and the anode assembly (32) sink into the enriched liquid simultaneously, and performing electro-deposition treatment for 10-20 min on the enriched liquid under conditions of a current of 2-3 A and a voltage of 32-35 V by using the electro-deposition unit (3) in the electro-deposition cavity (14); and discharging the liquid inside the housing body (11) from the second discharge outlet (140).

10. A nickel recycling method of the device according to claim 1, comprising:

S1: wastewater pretreatment adjusting a pH of nickel-containing wastewater to 3-9;

S2: extraction introducing the pretreated nickel-containing wastewater and a composite extraction agent into the extraction cavity (13) through the liquid mixing equipment according to a volume ratio of 9-12:1, and turning on the oscillating and floating component (21) and the rotating component (22) to assist in extraction for 10-20 min; opening the electromagnetic valve on the connection pipe, stopping feeding liquid after the extraction cavity (13) and the electro-deposition cavity (14) are filled with the nickel-containing wastewater, and turning off the rotating component (22); and performing extraction for 10-20 min under the assistance of the oscillating and floating component (21);

S3: desorption opening the electromagnetic valve on the first discharge outlet (130), reading a liquid level of heavy phase liquid on the display instrument, adding, to the electro-deposition cavity (14) through the liquid adding equipment, sulfuric acid that has the same volume as that of an electro-deposition solution and a concentration of 1 mol/L, driving sieve plates (142) to move in a vertical direction through electric drive rods (141), and obtaining enriched liquid after reaction for 15-25 min, where when the sulfuric acid is added, a light phase substance having the same volume as that of the sulfuric acid is discharged from the first discharge outlet (130), and the light phase substance is specifically wastewater without nickel ions; and S4: electro-deposition rotating a mounting rod (61) to enable the cathode assembly (31) to move in the vertical direction, driving, by using the drive rod, the second mounting unit and the anode assembly (32) arranged on the second mounting unit to move in the vertical direction to ensure that the cathode assembly (31) and the anode assembly (32) sink into the enriched liquid simultaneously, and performing electro-deposition treatment for 10-20 min on the enriched liquid under conditions of a current of 2-3 A and a voltage of 32-35 V by using the electro-deposition unit (3) in the electro-deposition cavity (14); and discharging the liquid inside the housing body (11) from the second discharge outlet (140).

* * * * *